United States Patent [19]
Garnett et al.

[11] 3,875,802
[45] Apr. 8, 1975

[54] PRESSURE SENSOR APPARATUS AND TRANSDUCER THEREFOR

[75] Inventors: Lawrence Taylor Garnett, Fullerton; LaVerne Dean Lyon, Claremont, both of Calif.

[73] Assignee: International Telephone and Telegraph Corporation, New York, N.Y.

[22] Filed: Oct. 1, 1973

[21] Appl. No.: 402,361

[52] U.S. Cl. .............. 73/398 AR; 73/407 R; 92/97; 92/104
[51] Int. Cl. ............................................. G01l 9/04
[58] Field of Search ........ 73/407, 398 AR, 408, 393, 73/397, 406; 92/97, 104, 130, 131, 133, 1, 103 M; 148/12.3

[56] References Cited
UNITED STATES PATENTS

| | | | |
|---|---|---|---|
| 2,174,171 | 9/1939 | Wasson et al. | 148/12.3 |
| 3,079,953 | 3/1963 | Mounteer | 92/104 |
| 3,389,362 | 6/1968 | McLellan | 73/398 AR |
| 3,500,271 | 3/1970 | Strauch | 73/398 R |
| 3,720,108 | 3/1973 | Freitag | 73/407 R |

OTHER PUBLICATIONS

Metals Handbook–Heat Treating, Cleaning, and Finishing, Vol. 2, American Society for Metals, 1964, p. 247, 249, 250.
Krell, George H., Sensing Pressure Through Diaphragms, in Chemical Engineering, 75: p. 87–92, July 1, 1968, TN1. M45.

*Primary Examiner*—Herbert Goldstein
*Assistant Examiner*—Marcus S. Rasco
*Attorney, Agent, or Firm*—A. Donald Stolzy

[57] ABSTRACT

A transmitter for receiving two fluid inlet pressures from opposite sides of an orifice in a pipeline or otherwise to produce a D.C. output current from, for example, 4 to 20 milliamperes directly proportional to the difference between the inlet pressures. The output of the transmitter may be connected to a milliammeter calibrated in pressure (pressure difference) or to a process controller or otherwise. The transmitter includes a differential pressure unit that, in turn, includes two pressure sensors or diaphragms connected in tandem. Diaphragm movement is converted to strain in a strain gage transducer that has two strain gages that are connected in a Wheatstone bridge with other resistors in the transmitter circuit. The transmitter circuit provides the said output current and may be conventional. Wheel embossed diaphragms operate with an extremely low maximum non-linearity for large deflections considering their low rate. For example, the rate is equivalent to a flat diaphragm but has a linear deflection ten times that of a flat diaphragm. Also, the rate is one-tenth the rate of a conventional corrugated diaphragm at equal or improved linearities in the range of deflections desirable. The differential pressure unit also has two flat back plates in which the respective diaphragms can stop when overpressure protection is needed. Therefore, no close fitting contours or valve operated liquid stops are required. The speed of response of the transmitter is kept advantageously high by employing limited full scale deflection. This deflection may be, for example, 0.015 inch for a 1.75 inches effective diameter.

14 Claims, 16 Drawing Figures

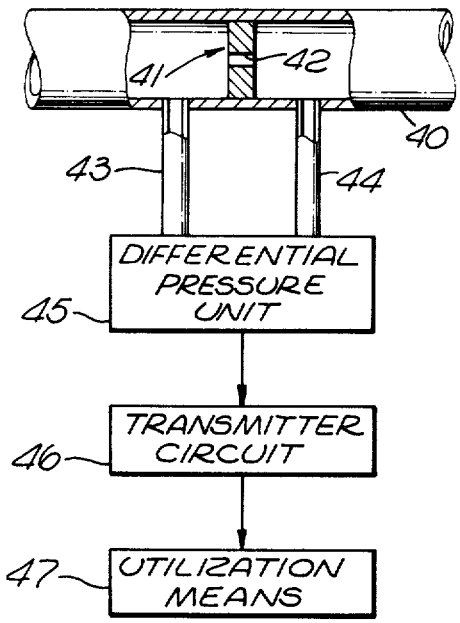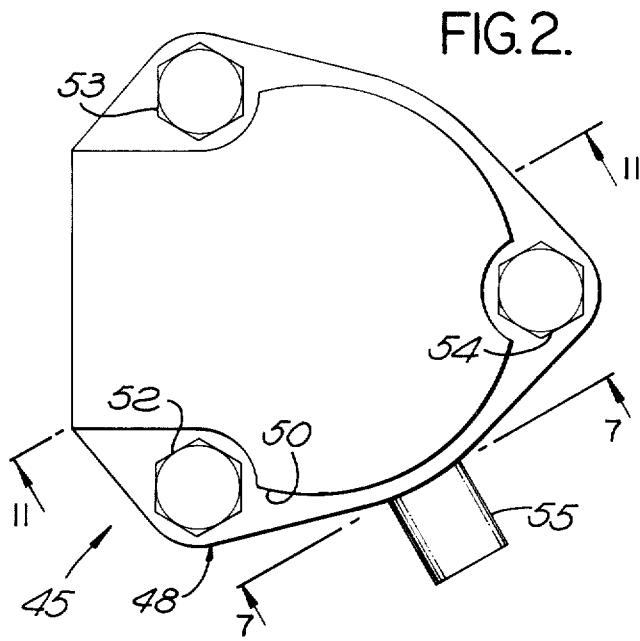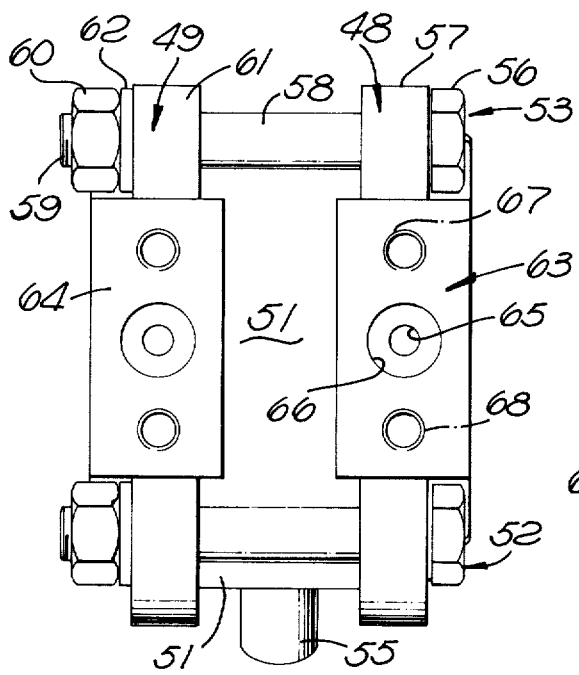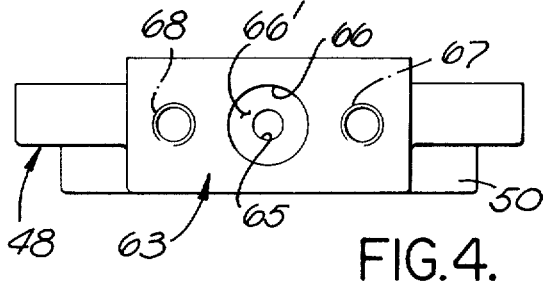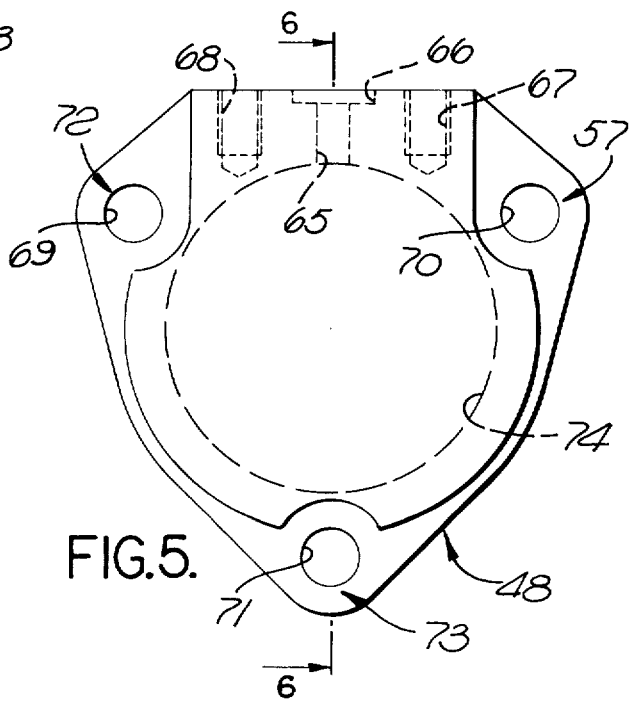

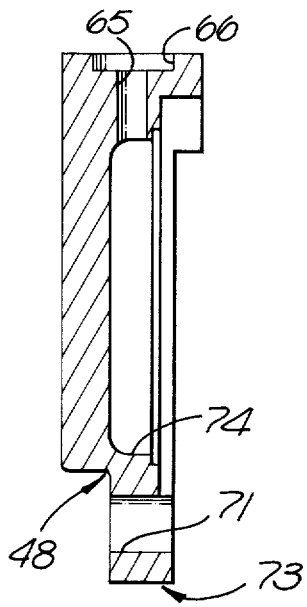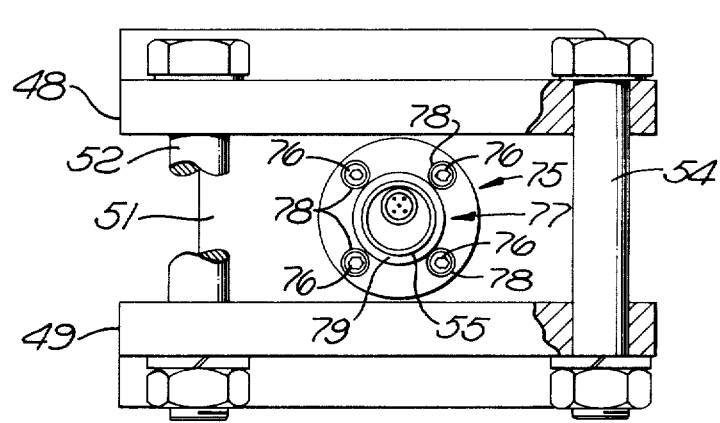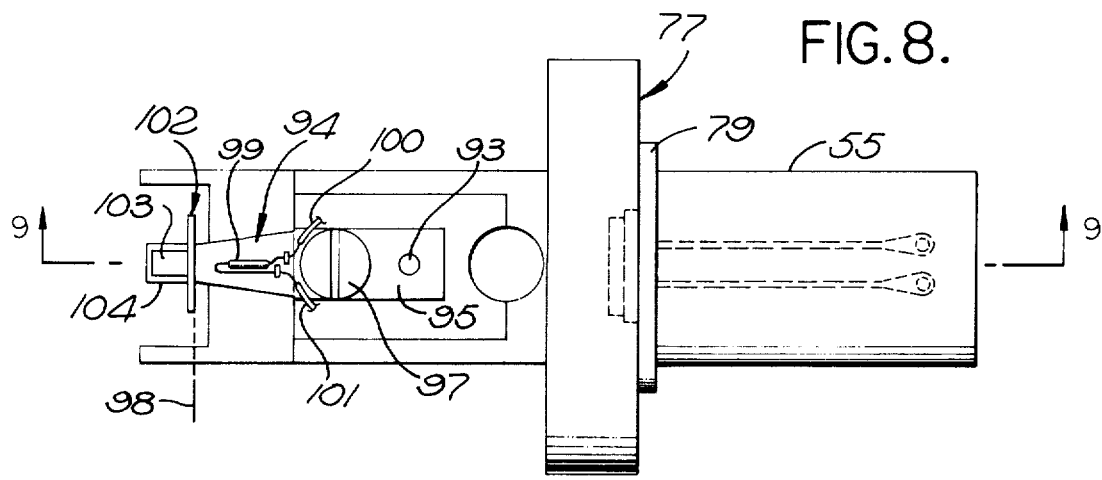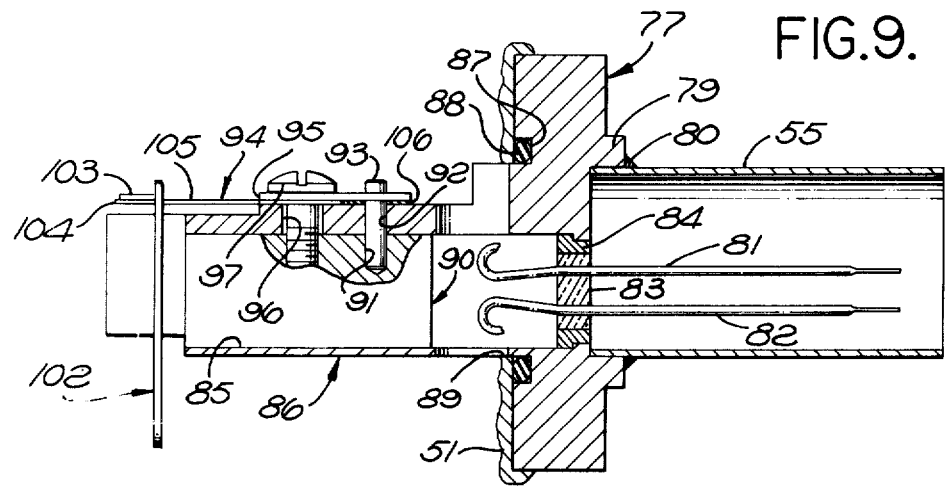
FIG. 6.
FIG. 7.
FIG. 8.
FIG. 9.

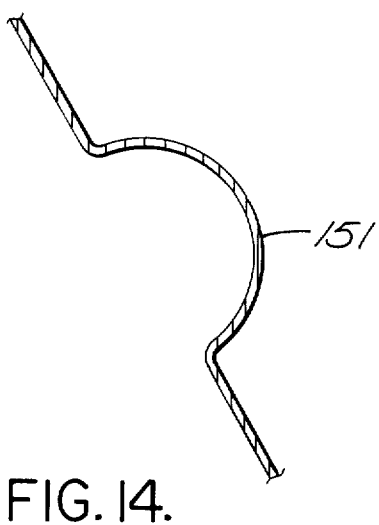
FIG. 14.
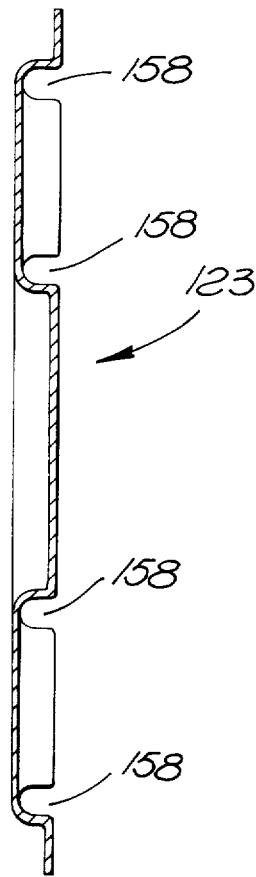
FIG. 15.
FIG. 16.
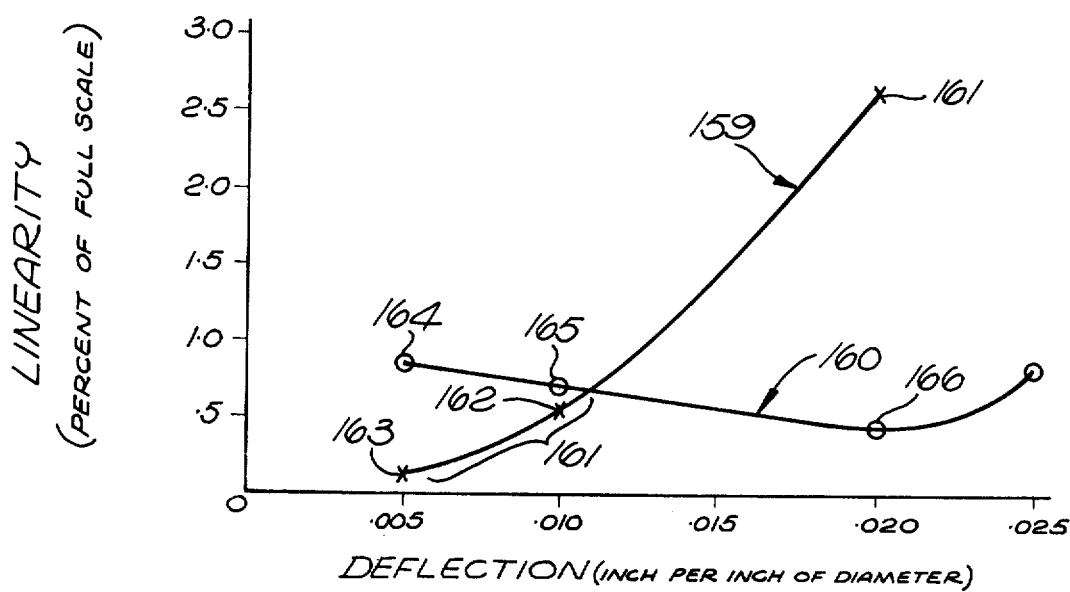

PRESSURE SENSOR APPARATUS AND TRANSDUCER THEREFOR

BACKGROUND OF THE INVENTION

This invention relates to pressure sensors, and more particularly, to apparatus for producing an output which is a function of one or more pressures of one or more fluids.

In the prior art, it has been the practice to connect two chambers of a device known as a differential pressure unit (DPU) to a pipeline on opposite sides of an orifice therein. The DPU is a part of apparatus commonly called a transmitter. The output of the transmitter is then impressed upon a D.C. milliammeter, a process controller or otherwise. If desired, the milliammeter may be calibrated to read directly in pressure or differential pressure. Alternatively, the milliammeter may be calibrated to read directly in volume rate of flow. For example, the milliammeter may be calibrated to read in cubic feet per minute.

The most popular DPU in the past seems to have been of the double bellows type. For example, see U.S. Pat. Nos. 2,590,324; 2,917,081; 2,945,510 and 3,343,420. However, metal diaphragm DPU's are not unknown. See U.S. Pat. Nos. 3,492,872 and 3,620,135. Metal diaphragms are also known in non-analogous arts. See U.S. Pat. Nos. 1,921,321; 2,913,008 and 3,079,953. Metal diaphragms are preferred because of superior cleaning capability.

Prior art transmitters operate with (1) high maximum non-linearization, (2) short ranges, or (3) diaphragm high minimum range with expensive or no overpressure protection. The diaphragms and bellows of the DPU's thereof also have low intrinsic rupture strengths. For example, a typical prior art DPU uses two complicated overpressure valves for overpressure protection.

SUMMARY OF THE INVENTION

In accordance with the pressure sensor apparatus of the present invention, the above-described and other disadvantages of the prior art are overcome by providing pressure sensor apparatus which has a high linearity over a very large range at a low rate with high intrinsic resistance to overpressure.

One outstanding feature of the present invention resides in the use of an embossed wheel pattern on a diaphragm, this construction providing good linearity over a long range at a low spring rate. The embossed wheel pattern diaphragms also have an exceedingly high rupture strength resulting in the use of inexpensive non-contoured back plates on which a diaphragm is supported for over pressure protection.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a schematic diagram of one embodiment of the present invention;

FIG. 2 is a top plan view of a differential pressure unit (DPU) constructed in accordance with the present invention;

FIG. 3 is a left end elevational view of the DPU shown in FIG. 2;

FIG. 4 is an end elevational view of a cover plate, two of which are employed in the DPU of FIGS. 2 and 3;

FIG. 5 is a top plan view of the cover plate shown in FIG. 4;

FIG. 6 is a longitudinal sectional view through the cover plate taken on the line 6—6 shown in FIG. 5;

FIG. 7 is a vertical sectional view of the DPU taken on the line 7—7 shown in FIG. 2;

FIG. 8 is a top plan view of a strain gage assembly employed in the DPU of FIGS. 2 and 3;

FIG. 9 is a vertical sectional view taken on the line 9—9 of the strain gage assembly shown in FIG. 8;

FIG. 14 is a greatly enlarged radial sectional view taken on the line 14—14 of the diaphragm shown in FIG. 13;

FIG. 15 is a vertical sectional view through the diaphragm shown in FIG. 13 and taken on the line 15—15 therein; and FIG. 16 is a graph of the linearity or non-linearity characteristics of the diaphragm shown in FIG. 13 and a conventional corregated diaphragm.

DESCRIPTION OF THE PREFERRED EMBODIMENT

Figures 10, 12:
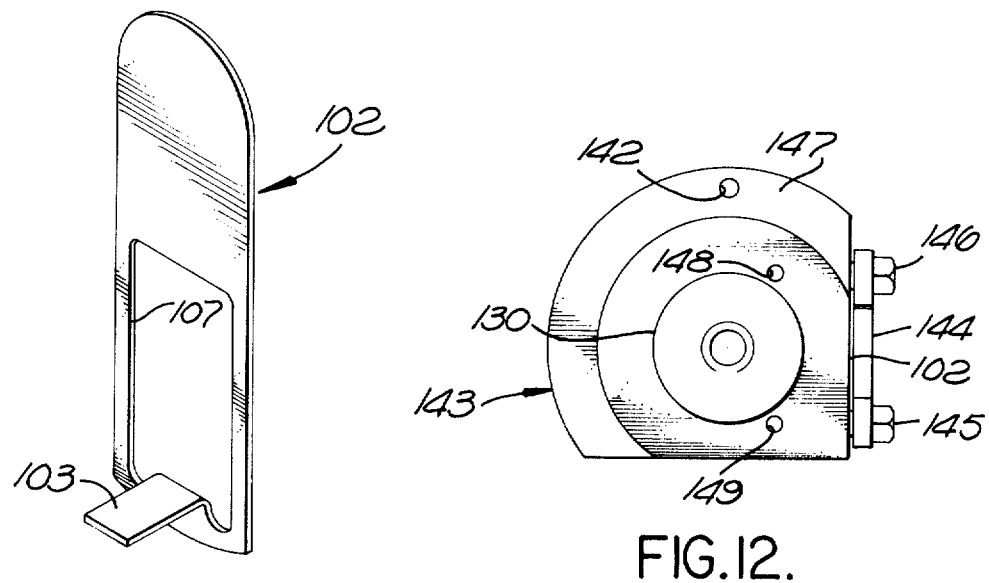
FIG. 10 is a perspective view of a metal stamping shown in FIGS. 8 and 9.
FIG. 12 is an end elevational view also shown in FIG. 11.

In the drawings, in FIG. 1, a pipeline is illustrated at 40 having a disc 41 sealed therein, disc 41 having an orifice 42. Conduits 43 and 44 are connected from pipeline 40 on opposite sides of orifice 42 to a differential pressure unit 45. A transmitter circuit 46 is connected from the output of differential pressure unit 45 (DPU 45) to utilization means 47.

DPU 45 and circuit 46 together form what is commonly known as a transmitter. Utilization means 47 may be a milliammeter calibrated in differential pressure or in volume rate of flow. Alternatively, utilization means 47 may be a process controller or otherwise.

DPU 45 is illustrated in FIGS. 2—15, inclusive.

Transmitter circuit 46 may be any conventional transmitter circuit. Alternatively, transmitter circuit 46 may be identical to that disclosed in U.S. Pat. No. 3,518,886, the two strain gages disclosed hereinafter being substituted for those two strain gages disclosed in the said U.S. Pat. No. 3,518,886. Some of the structures disclosed in U.S. Pat. No. 3,518,886 are duplicated in FIGS. 8 and 9 hereof. Thus, where such structures are duplicated, those structures may be omitted from the portion of the structures which are disclosed in U.S. Pat. No. 3,518,886 when the structures not omitted here are incorporated in the transmitter circuit 46.

It may be of assistance to note that throughout the FIGS. 2-15, inclusive, some of the several views are drawn to one scale and others to other different from the said one scale. Some views have been enlarged or greatly enlarged for clarity. Some background lines have also been omitted in connection with the diaphragms shown in FIGS. 11, 13 and 15, for clarity.

In FIG. 2, the DPU is indicated again at 45. DPU 45 has two cover plates. One cover plate is illustrated at 48 in FIG. 2. The other cover plate cannot be seen in FIG. 2 because it is exactly the same size as cover plate 48 and is aligned therewith. The other cover plate is illustrated at 49 in FIG. 3. Cover plate 49 will not be described in detail because it is identical to cover plate 48.

In FIG. 2, cover plate 48 has an upwardly extending boss 50. Both cover plates 48 and 49 are clamped over a body 51 shown in FIG. 3 by bolts 52, 53 and 54, shown in FIG. 2.

In FIG. 2, DPU 45 includes a hollow cylindrical tube 55 fixed relative to body 51. Tube 55 provides a housing for electrical leads which may be connected with the DPU 45. Tube 55 is illustrated in FIGS. 8 and 9 on a larger scale.

In FIG. 3, it will be noted that bolt 53 has a head 56 which abuts an ear 57 on cover plate 48. Bolt 53 has a shank 58 which is threaded at 59. A nut 60 is threaded to shank 58 and pulls cover plates 48 and 49 together firmly locking and clamping body 51 in a fixed position relative to the cover plates 48 and 49.

Cover plate 49 has an ear 61. A lock washer 62 is provided around bolt shank 58 between nut 60 and ear 61. Cover plate ears 57 and 61 have holes therethrough through which bolt shank 58 projects. All the bolts 52, 53 and 54 are, more or less, symmetrically positioned and have the same construction, are provided with nuts and lock washers, and help to hold the cover plates 48 and 49 in clamping engagement with body 51 in exactly the same way that bolt 53 does and as illustrated in FIG. 3 and described in connection with the showing in FIG. 3.

In FIG. 3, each of the cover plates 48 and 49 have end faces 63 and 64, respectively. As will be explained, cover plate 48 forms a first sealed chamber with body 51. Similarly, cover plate 49 forms a second sealed chamber with body 51 different from the said sealed chamber. In FIGS. 4 and 5, cover plate 48, thus, has a port 65 therethrough into the said first sealed chamber. End face 63 of cover plate 48 in FIGS. 3 and 4 has a counterbore at 66. End face 63 of cover plate 48 also has tapped holes 67 and 68 therein. The construction of port 65, counterbore 66 and tapped holes 67 and 68 is merely to provide a fluid coupling to, for example, any conventional conduit and end fitting therefor such as may be employed with conduits 43 and 44. In one example, the conduit itself may have a grooved end surface and an O-ring in the groove to seal against the annular end surface 66' of counterbore 66 and the port 65. See FIG. 4. Cap screws then may be employed to hold the fitting by being threaded into tapped holes 67 and 68.

FIG. 4 is a view of cover plate 48 turned 90° from the position shown in FIG. 3.

FIG. 5 is another top plan view of cover plate 48 illustrating the bolt holes 69, 70 and 71 through ears 72, 57 and 73 thereof, respectively.

In FIG. 5, cover plate 48 is cup shaped and has a cup-shaped chamber or recess 74 therein with which port 65 lies in communication. See FIG. 6.

In FIG. 7, a portion of a strain gage assembly 75 is illustrated fixed relative to body 51 by four hex head screws 76 that are slidable through corresponding holes in a flange 77 and are provided with washers 78. Flange 77 is illustrated both in FIGS. 8 and 9. However, the tapped holes in body 51 into which screws are threaded and the holes through flange 77 through which screws 76 are slidable are not illustrated.

As shown in all of the FIGS. 7, 8 and 9, flange 77 is provided with an annular boss 79. Tube 55 is brazed or otherwise fixed to flange boss 79 at 80 as shown in FIG. 9. Tube 55 is also illustrated in FIG. 7.

Four electrical conductors extend from the interior of body 51 to the exterior thereof, although only two such conductors, i.e. conductors 81 and 82, are illustrated in FIG. 9.

All four of the conductors are sealed through a glass disc 83. Glass disc 83 is, in turn, sealed within a metal ring 84. Metal ring 84 is, in turn, fixed in a bore 85 of a square tube 86 which is integral with flange 77.

Flange 77 has an O-ring groove 87 therein in which an O-ring 88 is located. Thus, when screws 76 draw flange 77 tight to body 51, a fluid tight seal is provided around an opening 89 through the wall of body 51. The reason for this is the DPU 45, as well as some conventional DPU's are filled with a liquid. In the instant case, the liquid fills the entire interior of body 51. At least as the space inside thereof is defined thereby and surrounding structures including, but not limited to, two diaphragms will be described.

In the construction illustrated in FIG. 9, a block or square rod section 90 is slidably positioned at the location illustrated in FIG. 9. Body 90 has a hole 91 extending part way thereinto. Tube 86 also has a hole 92 which is aligned with body hole 91. A locator pin 93 is then placed through both of the holes 91 and 92. Pin 93 may be press fit in either one or both of the tube 86 and the body 90.

A leaf spring cantilever beam 94 and a clamping plate 95 have holes which may be approximately aligned with a screw hole 96 through tube 86 and hold 92 into tube 86. Beam 94 and plate 95 may then be put in the position shown in FIGS. 8 and 9, and screw 97 slidably positioned therethrough and screwed into body 90 down tight against plate 95.

Beam 94 and some of the other structures illustrated in FIGS. 8 and 9, to the right of line 98 in FIG. 8, may be entirely conventional. For example, it is conventional to bond a strain gage at the same location on opposite sides of beam 94. Both such strain gages are employed. Only one such strain gage is illustrated at 99 in FIG. 8.

As is well known, each strain gage has two leads. Thus, one lead of each strain gage is connected to a corresponding respective conductor. The other leads of the strain gages are then connected to the respective conductors 81 and 82. An electrical lead 100 is connected from one end of strain gage 99 in FIG. 9. Another electrical lead 101 is connected from the other end of the strain gage 99. The connection of leads 100 and 101, and the two leads from the other strain gage to the conductors such as conductors 81 and 82, have been omitted for clarity.

A metal stamping 102 illustrated in FIG. 8 has a tab 103 that is brazed or otherwise fixed over its entire area to an end portion 104 of beam 94. See also FIGS. 9 and 10.

In FIG. 9, beam 94 has a portion 105 and a portion 106. Portion 106 is the fixed end portion. Portion 104 is the free end portion. Portion 105 is tapered as shown in FIG. 8. Portion 105 is called the constant strain region and is conventional. Portion 106 is also conventional. Portion 104 is not conventional. Portions 104 and 105 are integral with one another. Similarly, portions 105 and 106 are integral with one another. A top plan view of portion 106 would be identical to a top plan view of plate 95 in a view similar to that shown in FIG. 8.

As shown in FIG. 10, stamping 102 is made by shearing an aperture 107 therein which is somewhat U-shaped leaving tab 103, which is struck out, in a plane approximately perpendicular to the plane of the remainder of the stamping 102.

Figure 11:
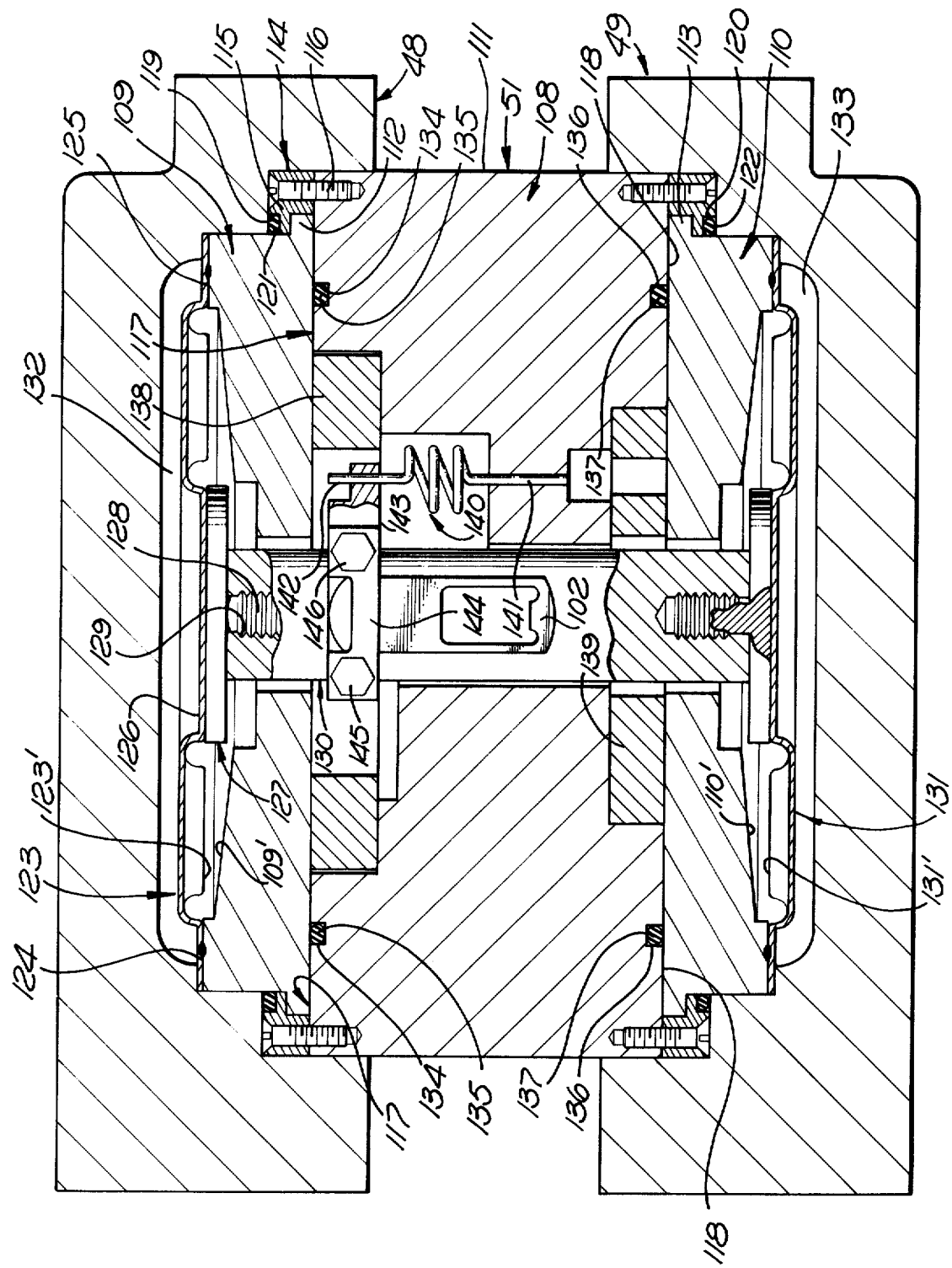
FIG. 11 is a vertical sectional view taken on the line 11—11 of the DPU shown in FIG. 2.

An enlarged sectional view of the DPU 45 taken on the line 11—11 in FIG. 2 is shown in FIG. 11.

In FIG. 11, body 51 is illustrated including a block 108 having plates 109 and 110 fixed against opposite annular end faces 117 and 118, respectively, of the block 108, block 108 having a cylindrical external surface 111 which may or may not be occasionally interrupted by other structures. Plates 109 and 110 are generally cylindrical but have end flanges 112 and 113, respectively.

Plate 109 is held tight against block 108 by a ring 114 that has a flange 115 to overlie flange 112. Preferably, four screws 16 are slidable through ring 114 and threaded into block 108 to hold plate 109 tight to block 108.

Cover plates 48 and 49 are again shown in FIG. 11. Ring 114 has an O-ring grove 119 therein. An O-ring 121 is located in groove 119 of ring 114. O-ring 121 provides a fluid tight seal between cover plate 48 and plate 109.

All the structures shown above the block end face 117, as viewed in FIG. 11, may be identical to all the structures shown below the block end face 118. For this reason, only a portion of the structures shown below block end face 118 will be described in further detail.

In FIG. 11, a generally circular metal diaphragm 123 is illustrated having an annular portion 124 which is seam welded to plate 109 on an annular surface 125 thereof. The seam weld provides a fluid tight seal around the complete circumference of plate 109 and also fixes the annular portion 124 of diaphragm 123 in position relative to plate 109.

In FIG. 11, diaphragm 123 has a circular center portion 126 to which a disc 127 is everywhere bonded. Disc 127 may have a stud 128 integral therewith or otherwise fixed thereto that is threaded into a tapped hole 129 in one end of a center post 130.

Plate 110 similarly has a metal diaphragm 131 fixed thereto. In accordance with the foregoing, both of the diaphragms 123 and 131 are fixed relative to the ends of post 130.

Post 130 preferably is slidable through certain bores in block 108. Preferably the diameters of the bores are oversize so that the post 130 does not touch any of them.

Note will be taken, in FIG. 11, that cover plate 48 and diaphragm 123 are spaced apart and define a chamber 132 therebetween, as mentioned previously. Similarly, cover plate 49 and diaphragm 131 define a chamber 133. Chambers 132 and 133 are fluid tight. For example, chamber 132 is fluid tight because of the use of O-ring 121, and also because the seam weld provides a seal between the annular portion 124 of diaphragm 123 and the annular surface 125 of plate 109.

The chambers 132 and 133 are fluid tight except, of course, for port 65 in cover plate 48 shown in FIG. 6 and a port identical to port 65 in cover plate 49.

Block end face 117 has an O-ring groove 134 therein in which an O-ring 135 is positioned to provide a fluid tight seal between block 108 and plate 109. Similarly, an O-ring groove 135 is provided in end face 118, and an O-ring 137 is positioned therein to provide a fluid tight seal between block 108 and plate 110.

Annular filler blocks 138 and 139 are provided to minimize the amount of fluid needed to fill all communicating chambers between the diaphragms 123 and 131, inside thereof. It is conventional, for example, to fill a bellows-type differential pressure unit with a silicone oil or other liquid as a partial overpressure protection.

A helically coiled spring 140 is provided having one end 141 fixed to block 108 and another end 142 fixed to a flange 143 which may be fixed to or integral with post 130.

Spring 140 may be omitted in some cases. When spring 140 is omitted, the DPU 45 becomes bi-directional. That is, the pressure in chamber 132 may be higher than that in chamber 133 or the pressure in chamber 133 may be higher than that in chamber 132. As shown, chamber 133 is the high pressure chamber. This is true because the force applied to flange 143 by spring 140 is in opposition to the deflection taken by diaphragm 131 on account of an increase in pressure in chamber 133.

In FIG. 11, stamping 102 is clamped to flange 143 in a fixed position relative to post 130 by a clamping plate 144 that holds stamping 102 tight against flange 143, plate 144 being held in a clamping position on stamping 102 by hex head screws 145 and 146 threaded into flange 143. Screws 145 and 146 thus hold plate 144 tightly against stamping 102, and, in turn, stamping 102 tightly against flange 143.

Portions 123' and 131' of diaphragms 123 and 131 nest in plates 109 and 110 during respective overpressures. When so nesting, diaphragm portions 123' and 131' seat upon respective frusto-conical surfaces 109' and 110' of plates 109 and 110, respectively.

As shown in FIGS. 11 and 12, plate 144 is U-Shaped.

Flange 143, as shown in FIG. 12, has a step portion 147. Flange 143 also has bleed holes 148 and 149. Bleed holes 148 and 149 extend completely through flange 143 and allow fluid on opposite sides of the flange 143 to flow therethrough more easily to increase the speed of response of the DPU 45, if desired. Alternatively, or in addition, bleed holes 148 and 149 may provide moderate or large restrictions to flow and thereby operate to damp the output of DPU 45.

As stated previously, diaphragm 131 may be identical to diaphragm 123, if desired. Diaphragm 123 will, thus, be the only diaphragm which will be described in further detail.

Figure 13:
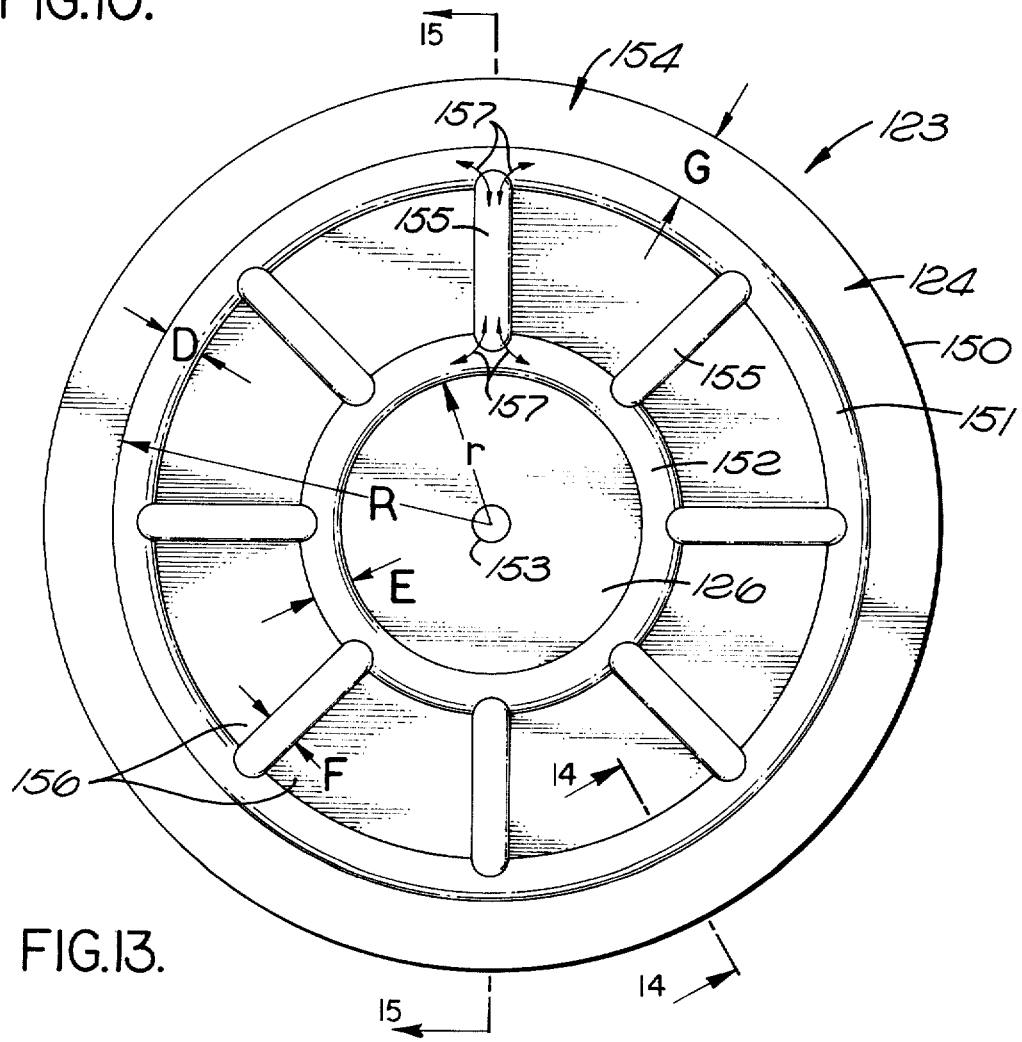
FIG. 13 is a top plan view of a diaphragm constructed in accordance with the present invention.

FIG. 13 is a top plan view of the diaphragm 123. If desired, diaphragm 123 may have a substantially uniform thickness throughout its complete extent. Diaphragm 123 is preferably made by forming a circular, thin, flat blank of uniform thickness equal to about 5 mils of 17-7 or 17-4 precipitation hardenable stainless steel. However, other materials are possible—even plastic. However, the said precipitation hardenable stainless steel is preferable for rupture strength. Other materials which may be used are Martensitic stainless steel, 400 stainless steel, the cobalt alloys such as the Hamilton Watch Company's cobalt alloy sold under the trade name "Elgilloy." Alternatively, 316 stainless steel may be employed. Diaphragm 123 may be made of any formable material having a ductility of 25 percent or more.

Diaphragms 123 and 131 may be made in an identical manner, if desired. Diaphragm 123 is, thus, formed between dies in a press to the size and shape illustrated, although not necessarily to scale, in FIGS. 13, 14 and 15.

In FIG. 13, diaphragm 123 is shown with the annular portion 124 thereof. Annular portion 124 may have substantially flat parallel surfaces in respective parallel planes except for a cylindrical surface 150 over the thickness thereof. Diaphragm 123 then has portions 151 and 152 which have opposite surfaces, each of which would generally be defined as one-half of a torus cut by a plane normal to the axis thereof with radii, R and r, defining different torus locations of certain surfaces of the portions 151 and 152.

The axis of the torus which would define one surface of portion 152 would be generally identical to the axis of the torus which would define one surface of portion 151. This axis would lie perpendicular to the plane of the drawing of FIG. 13 through the point 153. The portions 151 and 152 are connected by spokes 155, which with portions 151 and 152, form an embossed wheel 154. Each pair of immediately adjacent spokes 155 is connected by arcuately shaped webs 156. Each web also connects portions 151 and 152.

Each web 156, when diaphragm 123 is unstressed, has an upper surface that lies generally in the same plane as the upper surface of annular portion 124 and the upper surface of portion 126. The lower surfaces of portions 156, 124 and 126 similarly lie in the same plane.

Spokes 155 have generally a half cylinder shape. They may, for example, have a diameter, F, equal to about 130 mils, as shown in FIG. 15. The dimension, E, shown in FIG. 13 may also be 130 mils, if desired. The same is true of the dimension, D.

In FIG. 13, the dimention, G, may be 115 mils, if desired.

A view of the diaphragm 123 on the reverse side thereof might be substantially identical to that shown in FIG. 13. However, in this case, the embossments would become channels. Note that the diaphragm 123 has the spokes 155 and the portions 151 and 152 which are embossments on one side, i.e. on the side shown in FIG. 13. Thus, on the reverse side, the embossments become channels because diaphragm 123 has a substantially uniform thickness. In such a case, each channel corresponding to one spoke 155 would then lie in communication with channels in corresponding portions 151 and 152 as indicated by arrows 157 in FIG. 13.

If desired, the radius, R, may equal 2 1/2 inches. The radius, r, may be, if desired, one/half inch.

In FIG. 14, preferably portion 151 has a curvature, as shown, which is as nearly accurate to a semi-circle as possible. However, it may be a somewhat more complicated arc. The same would be true of a corresponding radially extending section through portion 152 and a section through a spoke 155 normal thereto.

As stated previously, background lines have been omitted in connection with the diaphragms 123 and 131 in FIGS. 11, 13 and 15 in several places for clarity. For example, background lines have been omitted at 158 in four locations in FIG. 15.

OPERATION

If fluid under pressure is admitted to chamber 133, which has a pressure in excess of the pressure of fluid in chamber 132, diaphragms 123 and 131 will deflect upwardly, as viewed in FIG. 11, moving post 130 in the same direction. Stamping 102 is fixed to post 130 and, therefore, deflects beam 94 shown in FIG. 8 in a downward direction in FIG. 9 because of the view taken. Strain will then be induced in both of the strain gages fixed to beam 94, and transmitter circuit 46 connected from the strain gages may cause utilization means 47 to indicate volume rate of flow, for example. As stated previously, utilization means 47, in this case, may be a milliammeter calibrated in volume rate of flow or gallons per minute. The ouput of transmitter circuit 46 in FIG. 1 may then be a D.C. current directly proportional to the difference between the pressures of the fluids in chambers 133 and 132.

One outstanding advantage of the DPU 45 is its linearity. This linearity is plotted at 159 in FIG. 16 as a function of deflection. The linearity of a corrugated circular diaphragm is plotted at 160 in FIG. 16 from data published by the U.S. National Bureau of Standards. In FIG. 16, note will be taken that curve 159 has a portion 161 over a deflection range which has a substantially better linearity than the curve 160. It is, in fact, generally in this area of curve 159 which the diaphragms 123 and 131 are operated.

Actually, it is common to call the curves 159 and 160 "linearity" curves. The fact of the matter is that the function graphed is a function of non-linearity rather than linearity. A point such as the X marked point 162 is taken from performance data. A pressure versus deflection curve is plotted first. The non-linearity, for example, at point 162 is then calculated by drawing a straight line from the origin (0, 0) to a point on the pressure versus deflection curve. The maximum error between zero and, for example, point 162 is measured. The percent linearity (actually non-linearity) for point 162 is then calculated by dividing the maximum error by the ordinate of point 162 and multiplying times 100.

By use of the embossed wheel pattern 154, it is possible to obtain good linearity over a large deflection, and to obtain a large deflection over a small pressure range.

The phrase "means to supply fluid under pressure" is hereby defined for use herein and in the claims to mean any one or more or all of the following, with or without other structures: a source of fluid under pressure, a conduit, a port or a similar admitting orifice.

The word "output," as used herein and in the claims, is hereby defined to include an output which is either mechanical or electrical or otherwise.

The word "integral" is hereby defined for use herein and in the claims to exclude a bolted, screwed, bonded, sealed or other connection of parts fastened together in any other similar ways, but to include only a molded or formed single, unitary piece of material that is found that way in its natural state or has been produced by a chemical reaction or smelted or the like such that it is substantially isotropic throughout a connection of two parts.

The phrase "utilization means" is hereby defined for use herein and in the claims to include, but not be limited to, an ammeter or milliammeter calibrated in volume rate of flow or in differential pressure, a process controller or otherwise.

In FIG. 16, curve 160 has points 164, 165 and 166. The data for all the points 161 to 166, inclusive, are as follows. The diaphragms corresponding to the curves 159 and 160 in FIG. 16 each had a radius, R, equal to 0.875 inches. The deflections for points 164, 165 and 166 were respectively equal to one/half, 1 and 2 percent of 2R. Points 164, 165 and 166 had percent non-linearities of 0.8, 0.7 and 0.4, respectively. For the same one/half, 1 and 2 percent of 2R deflections, points 163, 162 and 161 had percent non-linearities of 0.1, 0.6 and 2.6, respectively.

After diaphragm 123 in FIG. 13 is formed as shown therein and as shown in FIGS. 14 and 15, diaphragm 123 is precipitation hardened. This may be done by any conventional method. For example, diaphragm 123 may be heated in an evacuated chamber to 1,550°F. and the 1,550°F. held for 90 minutes. The diaphragm 123 is then cooled to room temperature by turning off the heat to the vacuum chamber and by passing nitrogen or another gas or gas mixture providing a neutral atmosphere through the vacuum chamber at about one atmosphere. Preferably, the diaphragm 123 is cooled to room temperature within one hour immediately succeeding the 90 minute period described above in this paragraph. Diaphragm 123 is then refrigerated to 0°F. for 30 minutes. Diaphragm 123 is then heated in the vacuum chamber again to 1,050°F. and this 1,050°F. temperature held for 90 minutes. The diaphragm 123 is then cooled in the same manner as before.

In an alternative embodiment of the invention, diaphragms may be coated with layers of plastic 2 or 3 mils thick for corrosion resistance or otherwise.

In the prior art, two openings have sometimes been employed into the interior of a DPU. These openings are employed so that air may be evacuated through one opening, and the fluid to fill the interior of the DPU may be introduced through the other opening. Such openings are not disclosed herein but any conventional ports may be provided for that purpose.

In FIG. 13, the curvature of the portions 151 and 152, and the curvature of the spokes 155 are specially adapted to make the diaphragm 123 strong. It will withstand exceedingly high loads.

Any conventional transducer may be substituted for the portion of a transducer shown in FIG. 8. Alternatively, the strain gages in FIG. 8 may be bonded to beam 94 by the use of glass, an epoxy or otherwise. As alternatives for the transducer of FIG. 8, a torque tube output or an electromechanical pick-up or other devices are also possible.

Diaphragms 123 and 131 may alternatively be made of 316 stainless steel.

Notwithstanding the foregoing, it will be appreciated that the use of two diaphragms is not always required. The present invention may be practiced by the use of one diaphragm. For prior art on single bellows and differential pressure units, see, for example U.S. Pat. No. 2,752,949.

As stated previously, the large bonding areas and flexibility of the tab 103 of stamping 102 and its bond over its entire area to the portion 104 of beam 94 in FIG. 8 provide for extremely good accuracy.

The phrase "full scale deflection" is hereby defined to include deflection in one direction only either away from or toward an unstressed position.

This application contains some subject matter common to that disclosed in applications Ser. Nos. 402,336; 402,036; and 402,035, all filed on Oct. 1, 1973, by L. T. Garnett, R. P. Granada and L. D. Lyon, respectively, for MECHANICAL SPAN AND ZERO ADJUSTMENT APPARATUS FOR PRESSURE TRANSMITTERS, COLD WORKING PROCESS AND FLUID PRESSURE SENSING SYSTEM AND DIFFERENTIAL PRESSURE UNIT THEREFOR, respectively.

In FIG. 16, the diaphragm of curve 160 has an equally bad linearity when deflected in the opposite direction and an undesirable abrupt change in rate at a neutral (e.g. zero deflection) position. The diaphragm of the curve 159 had an equally good linearity when deflected in the opposite direction (one-half of non-linearity indicated in FIG. 16) and no undesirable abrupt change in rate at a neutral position. In these two instances, "rate" means the slope of the curves 159 and 160 on opposite sides of the neutral position at small positive and negative deflections, e.g. at deflections of ±0.008 inch, more or less.

The tapped hole 68 in FIG. 5 has been omitted in FIG. 11 for clarity.

What is claimed is:

1. Apparatus for connection from a source of a fluid under pressure to produce an output which is a function of the fluid pressure, said apparatus comprising: a body having a hole extending completely therethrough; a generally planar, flexible diaphragm fixed relative to said body over each end of said hole, each said diaphragm having a central portion including a circular embossment outside said body having a surface the same as one-half of a torus cut by a plane normal to its axis, each said diaphragm having an approximately uniform thickness throughout its extent, each of said diaphragm central portions also including a circular flat portion everywhere connected with said embossment inside thereof; a disc for each diaphragm of approximately the same diameter as those of the respective diaphragm flat portions and everywhere bonded thereto, each said disc having a threaded stud on the same axis; a post threaded at its opposite ends to said studs, respectively, said post being fixed relative to both of said studs; input means for supplying fluids to one side of each of said diaphragms outside said body, said fluids being under different pressures; and output means connected between said post and said body to produce an output which is a function of the difference between the pressures of said fluids.

2. A transducer comprising: a base; a member; means mounting said member on said base to move in a predetermined direction in accordance with a predetermined variable; a leaf spring cantilever beam having a beam plane and a plane of symmetry normal thereto and having one fixed end and another opposite end free; a strain gage fixed to opposite sides of said beam; means mounting said beam in a fixed position relative to said base and in a position approximately normal to said predetermined direction; a stamping fixed to said member to move generally in a plane normal to both of said symmetrical and beam planes, said stamping having a U-shaped hole punched therethrough leaving a tab thin in comparison to its length which is struck out into a plane which is generally normal to that of said stamping, said beam free end projecting toward said hole over and being fixed relative to said tab in a position spaced from said stamping plane; and output means connected from said strain gages to produce an output signal of a magnitude directly proportional to said member movement.

3. The invention as defined in claim 2, wherein said mounting means includes means to move said member in a manner to cause said beam to bend only in said predetermined direction.

4. Apparatus for connection from a source of a fluid under pressure to produce an output which is a function of the fluid pressure, said apparatus comprising: an annular body having a flat, annular surface between a first inner circle and a first outer circle concentric with said first inner circle; a generally planar circular diaphragm having a generally symmetrical center and an axis through said center normal to the diaphragm plane, said diaphragm also having a flat circular portion around said center and a flat annular portion at its outer edge between a second inner circle and a second outer circle concentric with said second inner circle, said diaphragm annular portion being fixed relative to said body annular surface in a position such that all of said circles are concentric with said diaphragm axis, said second outer circle having a predetermined diameter, said diaphragm having an approximately uniform thickness throughout its extent, which thickness is substantially less than said second outer circle diameter, said diaphragm having an intermediate portion connected between said circular and annular portions thereof, said diaphragm intermediate portion having a wheel-shaped embossment thereon, said wheel having a hub portion, a rim portion and a plurality of spokes, said hub portion being connected from said diaphragm circular portion to said spokes, said hub portion having a surface in the shape of one-half of a first torus cut by a plane normal to its axis, said first torus axis being congruent with said diaphragm axis, said rim portion being connected from said spokes to said diaphragm annular portion, said rim portion being spaced radially from said hub and having a surface in the shape of one-half of a second torus cut by a plane normal to its axis, said second torus axis also being congruent with said diaphragm axis, said hub portion, said rim portion and said spokes all being embossed on the same side of said diaphragm intermediate portion, said hub portion, said rim portion and said spokes all being concavo-convex and defining respective channels in the other side of said diaphragm due to the approximately uniform thickness therof, the channel of each spoke communicating with both of those of said hub and rim portions, said diaphragm intermediate portion having a flat arcuate portion filling the gap between and connected between each pair of immediately adjacent spokes and filling the gap between and connected between the respective hub and rim portions connecting each said respective pair of immediately adjacent spokes, said spokes being uniformly distributed around and projecting in radial directions from said diaphragm axis, the surface of each said flat portion on said one diaphragm side lying generally in a single plane when said diaphragm is unstressed; input means for supplying a fluid under pressure to said one side of said diaphragm; and output means including auxiliary means connected between said diaphragm circular portion and said body to produce an output which is a function of said fluid pressure.

5. The invention as defined in claim 4, wherein each of said spokes approximately has the shape of a thin hollow half cylinder of approximately concentric internal and external surfaces which are uniform in diameter throughout the length of each respective spoke, all of said internal spoke surface diameters being the same, all of said external spoke surface diameters being the same, each half cylinder being formed by cutting a thin hollow cylinder with a plane through the cylinder axis.

6. The invention as defined in claim 5, wherein said output means includes utilization means connected from said auxiliary means.

7. The invention as defined in claim 6, wherein said auxiliary means produces a D.C. current directly proportional to said fluid pressure, said utilization means including a milliammeter calibrated in weight per unit area.

8. The invention as defined in claim 7, wherein said diaphragm is made of metal, said spokes being eight in number, each immediately adjacent pair of spokes having radial axes angularly spaced apart 45°, said diaphragm annular portion being sealed to, fixed to and bonded to the complete circumference of said body annular surface by being seam welded thereto.

9. The invention as defined in claim 5, wherein said diaphragm is made of metal.

10. The invention as defined in claim 4, wherein said diaphragm is made of metal.

11. The invention as defined in claim 5, wherein said diaphragm annular portion is sealed to, fixed to and bonded to said body annular surface around the complete circumference thereof.

12. The invention as defined in claim 4, wherein said diaphragm annular portion is sealed to, fixed to and bonded to said body annular surface around the complete circumference thereof.

13. A transducer comprising: a base; a member; means mounting said member on said base to move in a predetermined direction in accordance with a predetermined variable; a leaf spring cantilever beam having a beam plane and a plane of symmetry normal thereto and having one fixed end and another opposite end free; a strain gage fixed to opposite sides of said beam; means mounting said beam in a fixed position relative to said base and in a position approximately normal to said predetermined direction; a stamping fixed to said member to move generally in a plane normal to both of said symmetrical and beam planes, said stamping having a U-shaped hole punched therethrough leaving a tab which is struck out into a plane which is generally normal to that of said stamping, said beam free end projecting toward said hole over and being fixed relative to said tab; and output means connected from said strain gages to produce an output signal of a magnitude directly proportional to said member movement, said tab projecting in the same direction from said stamping as said beam projects from said fixed end thereof, said beam free end projecting all the way through said hole, said tab and said beam free end having facing planar, parallel surfaces bonded together.

14. The invention as defined in claim 13, wherein said mounting means includes means to move said member in a manner to cause said beam to bend only in said predetermined direction.

* * * * *